(12) United States Patent
Munday et al.

(10) Patent No.: US 10,331,533 B2
(45) Date of Patent: *Jun. 25, 2019

(54) METHODS FOR UPDATING MEMORY MAPS OF A SYSTEM-ON-CHIP

(71) Applicant: Altera Corporation, San Jose, CA (US)

(72) Inventors: David Alexander Munday, Santa Cruz, CA (US); Matthew Harbridge Gerlach, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,752

(22) Filed: Dec. 14, 2017

(65) Prior Publication Data

US 2018/0203781 A1 Jul. 19, 2018

Related U.S. Application Data

(63) Continuation of application No. 15/065,746, filed on Mar. 9, 2016, now Pat. No. 9,852,040.

(51) Int. Cl.
| G06F 11/00 | (2006.01) |
| G06F 11/30 | (2006.01) |
| G06F 11/32 | (2006.01) |
| G06F 11/07 | (2006.01) |
| G06F 11/267 | (2006.01) |

(52) U.S. Cl.
CPC ........ *G06F 11/3037* (2013.01); *G06F 11/079* (2013.01); *G06F 11/267* (2013.01); *G06F 11/327* (2013.01)

(58) Field of Classification Search
USPC .......................................................... 714/42
See application file for complete search history.

(56) References Cited

U.S. PATENT DOCUMENTS

| 6,836,842 B1 * | 12/2004 | Guccione | ............ G06F 15/7867 |
| | | | 713/100 |
| 2013/0193850 A1 * | 8/2013 | Demuynck | ........... F21V 23/006 |
| | | | 315/113 |
| 2016/0062859 A1 * | 3/2016 | Bargagni | ............ G06F 11/2094 |
| | | | 714/6.2 |

* cited by examiner

*Primary Examiner* — Sarai E Butler
(74) *Attorney, Agent, or Firm* — Fletcher Yoder, P.C.

(57) ABSTRACT

This disclosure relates to techniques for updating a memory map maintained by processing circuitry that is coupled to programmable logic circuitry. One of the techniques may involve detecting reconfiguration of a device component formed on a portion of the programmable logic circuitry using monitoring circuitry. The technique may further include generating a notification event based on the reconfiguration of the device component using the monitoring circuitry. The notification event may then be sent to the processing circuitry using the monitoring circuitry. The technique may further involve updating, using the processing circuitry, the memory map based on the notification event.

20 Claims, 7 Drawing Sheets

METHODS FOR UPDATING MEMORY MAPS OF A SYSTEM-ON-CHIP

This is a continuation of U.S. patent application Ser. No. 15/065,746, filed Mar. 9, 2016, and entitled "Methods for Updating Memory Maps of a System-on-Chip", the entirety of which are incorporated by reference for all purposes.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Microprocessor based computing systems can implement a variety of currently available operating systems, for example, Linux, Windows, Android, iOS, and OS X among others. During the normal operation of an operating system, the microprocessor maintains a memory map to enable access to various peripherals connected to the processing circuitry, for example memory devices, input/output devices, etc. Peripheral buses may be used to interface peripheral devices to the computing system. Examples of these buses include the Universal Serial Bus (USB) and the Institute of Electrical and Electronic Engineers (IEEE) 1394 standard bus. These serial buses provide a simple method of attaching and accessing peripheral devices.

A USB-based computing system typically includes one or more USB clients (USB clients are also referred to interchangeably as "USB devices", "USB client devices", etc.), a USB host controller, and one or more hubs. Examples of USB devices are USB-compatible digital cameras, printers, keyboards, scanners, modems, mice, and digital phones. All USB devices attach directly to a USB host (or host controller) or via a USB hub, which provides one or more ports. USB makes plugging in new peripherals easy with plug-and-play capabilities, is much faster than a Personal System (PS)/2 connector or Recommended Standard (RS) 232 connector, allows automatic updating of the computing system's memory map, and supports multiple device connectivity. USB allows expandability of the capabilities of a computing system via an external port, eliminating the need for users or integrators to open the system chassis.

The advancement of computer chip technology has also resulted in the development of embedded processors and controllers and even embedded networks having multiple linked devices. An embedded processor or controller can be a processing circuitry, for example microprocessor or microcontroller circuitry, that has been integrated into an electronic device as opposed to being built as a standalone module or "plugin card." Advancement of technology related to Programmable Logic Devices (PLD), for example Field-Programmable Gate Arrays (FPGA) has led to the development of FPGA-based system-on-chip (SOC) and network-on-chip (NOD) including FPGA-based embedded processor SOCs.

A SOC is a fully functional product having its electronic circuitry contained on a single chip. While a microprocessor chip requires ancillary hardware electronic components to process instructions, a SOC would include all required ancillary electronics simple example is a smartphone SOC that includes a processing circuitry like a microprocessor, encoder, decoder, digital signal processor (DSP), RAM, and ROM. Furthermore, processing circuitry in this context may also include PLDs. Many SOCs with processing circuitry and PLDs can also implement available operating systems. However, SOCs based on processing circuitry and PLDs lack USB-like plug-and-play capabilities. In fact, many of today's SOCs require rebooting the processing circuitry to update the memory map maintained by the processing circuitry after a reconfiguration of the PLD of the SOC.

Therefore, it would be desirable to be able to plug-and-play functionality for detecting device component reconfiguration and updating of memory maps in SOCs.

SUMMARY

Embodiments described herein include methods of initializing a memory device and an initialization apparatus. It should be appreciated that the embodiments can be implemented in numerous ways, such as a process, an apparatus, a system, a device, or a method. Several embodiments are described below.

In one embodiment, a method of updating a memory map maintained by processing circuitry that is coupled to programmable logic circuitry is described. The method may include an operation to detect a reconfiguration of a device component formed in a portion of the programmable logic circuitry using monitoring circuitry. The method may further include an operation to generate a notification event based on the reconfiguration of the device component using the monitoring circuitry. The method may include an operation to send a notification event to the processing circuitry using the monitoring circuitry. The method may also include an operation to update, using the processing circuitry, the memory map based on the notification event.

In an embodiment, the monitoring circuitry communicates with the processing circuitry using an interface circuitry and the device component belongs to a plurality of device components.

In another embodiment, the monitoring circuitry further comprises a plurality of monitoring circuits, wherein each monitoring circuit in the plurality of monitoring circuits is communicatively coupled to a respective device component in the plurality of device components.

In yet another embodiment, the notification event comprises a base address of the respective device component and a span of addresses associated with the respective device component. The method of updating the memory map may further include an operation to assign an additional base address and an additional span of addresses to the interface circuitry at boot up using the processing circuitry.

In an embodiment, the sum of the spans of addresses associated with each respective device component of the plurality of respective device components is less than or equal to the additional span of addresses.

In an embodiment, the method of updating a memory map maintained by processing circuitry that is coupled to programmable logic circuitry may further include an operation to detect the forming of a new device component in the portion of the programmable logic circuitry using the monitoring circuitry. The method may also include an operation to detect the resetting of the portion of the programmable logic circuitry using the monitoring circuitry. The method may also include an operation to stop using the processing circuitry, the device component prior to the reconfiguration of the device component. The method may also include an operation to reconfigure the portion of the programmable logic circuitry using the programmable logic circuitry. The method may also include an operation to start the device component after updating the memory map using the processing circuitry.

In one embodiment, a method of updating a memory map maintained by processing circuitry that is coupled to programmable logic circuitry is described. The method may include an operation to detect a reconfiguration of a device component formed in a portion of the programmable logic circuitry using monitoring circuitry. The method may further include an operation to generate a notification event based on the reconfiguration of the device component using the monitoring circuitry. The method may include an operation to send a notification event to the processing circuitry using the monitoring circuitry. The method may also include an operation to update the memory map based on the notification event without rebooting the processing circuitry.

DETAILED DESCRIPTION

Embodiments of the present invention relate to integrated circuits with logic circuitry. The integrated circuits may be any suitable type of integrated circuit, such as microprocessors, application-specific integrated circuits, digital signal processors, memory circuits, or other integrated circuits. If desired, the integrated circuits may be programmable integrated circuits that contain programmable logic circuitry. The present invention will generally be described in the context of integrated circuits such as programmable logic device (PLD) integrated circuits as an example. In the following description, the terms 'circuitry' and 'circuit' are used interchangeably.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Figure 1:
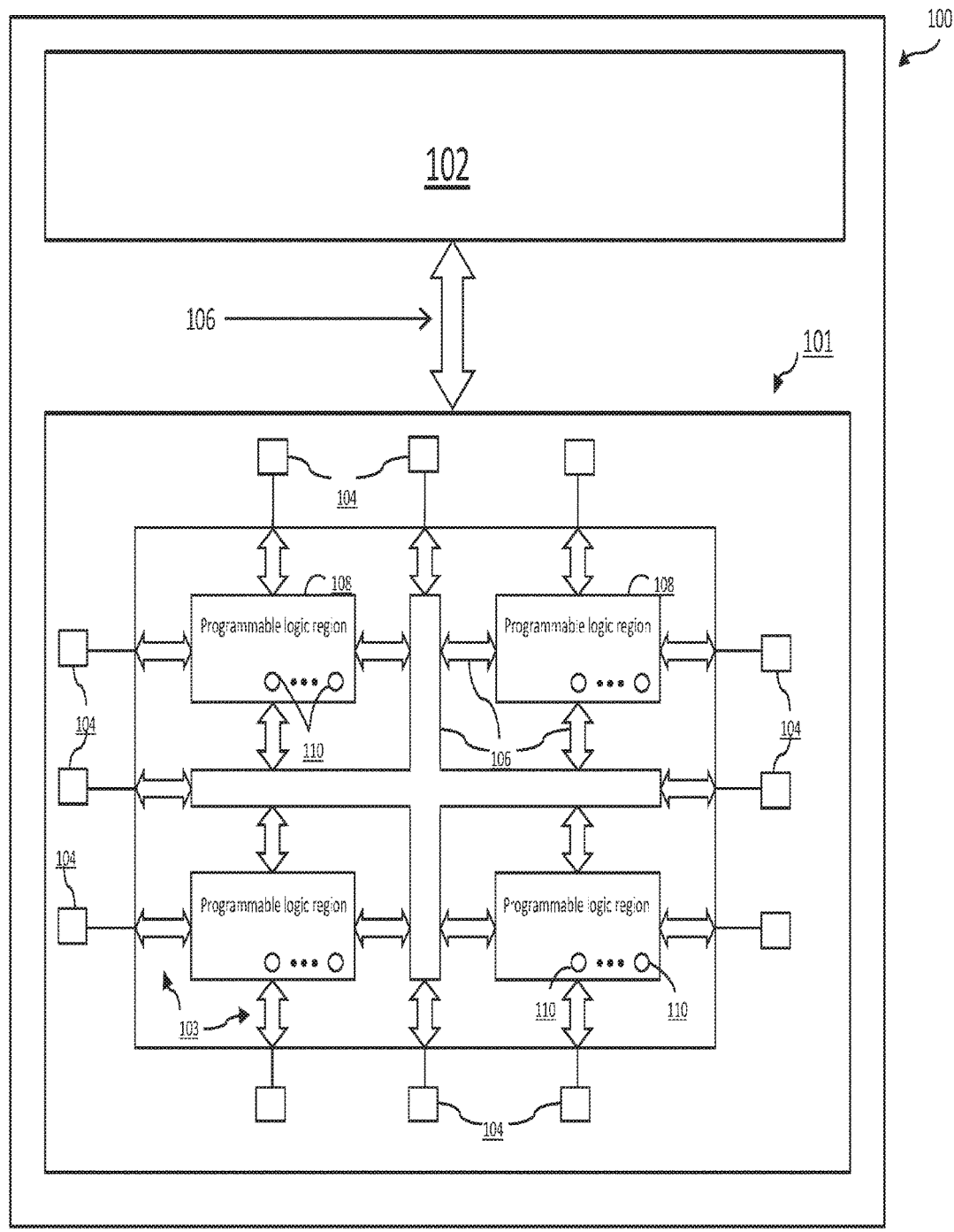
FIG. 1 illustrates an example system-on-chip (SOC) in accordance with an embodiment of the present invention.

FIG. 1 illustrates an example system-on-chip (SOC) 100 in accordance with an embodiment of the present invention. In FIG. 1, the SOC 100 may include processing circuitry 102 communicatively coupled to a programmable logic device (PLD) circuit 101 via interconnection circuitry 106. Processing circuitry 102 may be a central processing unit (CPU), a microprocessor, a floating-point coprocessor, a graphics coprocessor, a hardware controller, a network controller, a Reduced Instruction Set Computing (RISC) based processor such as an Acorn RISC Machine (ARM) processor, or other processing unit.

PLD circuit 101 may include input-output circuitry 103 for driving signals off PLD circuit 101 and for receiving signals from other devices via input-output pins 104. Interconnect circuitry 106 may include interconnection resources such as global and local vertical and horizontal conductive lines and buses may be used to route signals on PLD circuit 101. Interconnect circuitry 106 includes conductive lines and programmable connections between respective conductive lines and is therefore sometimes referred to as programmable interconnects.

Interconnect circuitry 106 may form a network-on-chip (NOC). NOC may be a system of interconnect resources such as multiplexers and de-multiplexers that applies general networking technologies to connect processing circuitry 102 with PLD circuit 101 and to route signals on PLD circuit 101. The NOC may perform network communication functions. For example, the NOC may perform routing functions, gateway functions, protocol or address translation, and security functions.

PLD circuit 101 may include programmable logic region 108 that can be configured to perform a custom logic function. Programmable logic region 108 may include combinational and sequential logic circuitry. Interconnect circuitry 106 may be considered to be a type of programmable logic 108.

PLD circuit 101 may also contain programmable memory elements 110. Programmable memory elements 110 can be loaded with configuration data (also called programming data) using pins 104 and input-output circuitry 103. Once loaded, the programmable memory elements 110 may each provide a corresponding static control signal that controls the operation of an associated logic component in programmable logic 108. In a typical scenario, the outputs of the loaded programmable memory elements 110 are applied to the gates of metal-oxide-semiconductor transistors in programmable logic 108 to turn certain transistors on or off and thereby configure the logic in programmable logic region 108 and routing paths. Programmable logic circuit elements that may be controlled in this way include pass transistors, parts of multiplexers (e.g., multiplexers used for forming routing paths in interconnect circuitry 106), look-up tables, logic arrays, various logic gates, etc.

Programmable memory elements 110 may be implemented using any suitable volatile and/or non-volatile memory structures such as random-access-memory (RAM) cells, fuses, antifuses, programmable read-only-memory memory cells, mask-programmed and laser-programmed structures, resistive memory structures, combinations of these structures, etc. Because programmable memory elements 110 are loaded with configuration data during programming, programmable memory elements 110 are sometimes referred to as configuration memory, configuration RAM (CRAM), or programmable memory elements.

The circuitry of PLD circuit 101 may be organized using any suitable architecture. As an example, the logic of PLD circuit 101 may be organized in a series of rows and columns of larger programmable logic regions 108 each of which contains multiple smaller logic blocks 112. The smaller logic blocks may be, for example, regions of logic that are sometimes referred to as logic elements (LEs), each containing a look-up table (LUT), one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (as an example). The larger regions may be, for example, logic array blocks (LABS) containing multiple logic elements or multiple ALMs. In the example of FIG. 1, illustrative smaller logic blocks 112 (which may be, for example, LEs or ALMS) are shown in one of the larger regions of programmable logic 108 in FIG. 1 (which may be, for example, a logic array block). In a typical PLD circuit 101, there may be hundreds or thousands of smaller logic blocks 112. The smaller logic blocks 112 that are shown in FIG. 1 are merely illustrative.

During device programming, configuration data is loaded into PLD circuit 101 that configures the smaller logic blocks 112 and programmable logic regions 108 so that their logic resources perform desired logic functions on their inputs and produce desired output signals. For example, CRAM cells are loaded with appropriate configuration data bits to configure adders and other circuits on PLD circuit 101 to implement desired custom logic designs.

The resources of PLD circuit 101, such as programmable logic 108, may be interconnected by programmable interconnects 106. Programmable interconnects 106 generally include vertical and horizontal conductors. These conductors may include global conductive lines that span substantially all of device 101, fractional lines such as half-lines or quarter lines that span part of PLD circuit 101, staggered lines of a particular length (e.g., sufficient to interconnect several logic array blocks or other such logic areas), smaller local lines, or any other suitable interconnection resource arrangement. If desired, the logic of PLD circuit 101 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 1, PLD circuit 101 generally also includes some programmable logic associated with the programmable interconnects, memory, and input-output circuitry on PLD circuit 101. For example, input-output circuitry 103 may contain programmable input and output buffers. Programmable interconnects 106 may be programmed to route signals to a desired destination.

Figure 2:
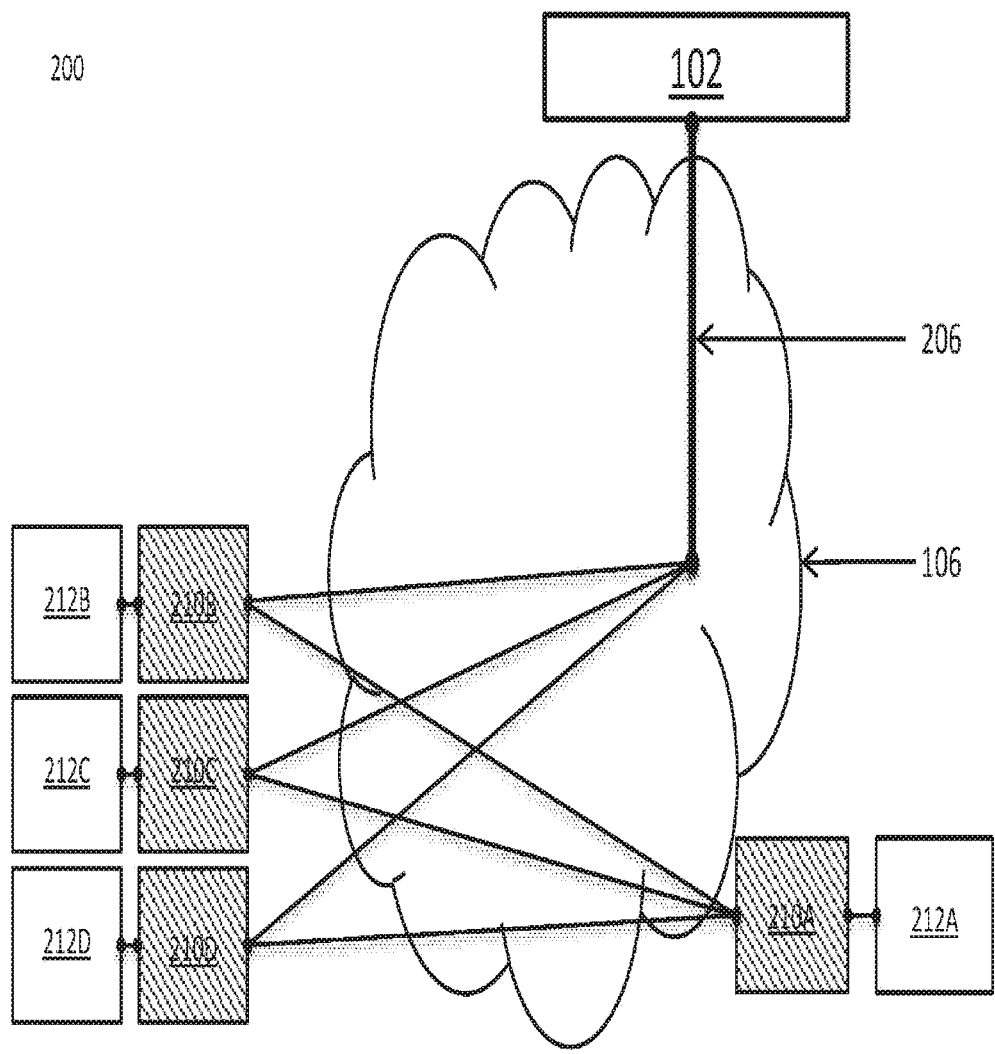
FIG. 2 illustrates an example circuit system with monitoring circuits coupled to device components in accordance with an embodiment of the present invention.

FIG. 2 illustrates an example circuit system with monitoring circuits coupled to device components in accordance with an embodiment of the present invention. For the purposes of illustrating clear examples, the circuit system 200 of FIG. 2 will be discussed in connection with the SOC 100 of FIG. 1. Referring to FIG. 2, the circuit system 200 comprises monitoring circuits 210A, 210B, 210C, and 210D which are respectively coupled to device components 212A, 212B, 212C, and 212D through an interconnect circuitry 106. Monitoring circuits 210A, 210B, 210C, and 210D are communicatively coupled to processing circuitry 102 via interface circuit 206.

The following description refers to memory maps and updating of memory maps. A memory map is a massive table, in effect a database that comprises complete information about how the memory is structured in a computer system. In the boot process, a memory map instructs an operating system kernel about memory layout and peripherals or components available to the operating system. The memory map may contain information regarding the size of total memory, any reserved regions, and may also provide other details specific to the architecture. The memory map needs to be updated constantly so that processing circuitry 102 has access to the peripheral devices. Thus, any change in the connection status of an existing peripheral device or an addition of a new peripheral device requires an update of the memory map respectively.

The following steps are implemented according to one embodiment. A monitoring circuit such as monitoring circuit 210B may detect a reconfiguration of a corresponding device component formed in a programmable logic region 108 of the PLD circuit 100 such as device component 212B. Component 212B may be coupled to monitoring circuit 210B via interconnect circuitry 106. Monitoring circuit 210B may generate a notification event based on the reconfiguration of the device component 212B. The notification event is sent from monitoring circuit 210B to processing circuitry 102 through interface circuit 206. Processing circuitry 102 may subsequently update a memory map maintained by processing circuitry 102 based on the notification event.

Referring to FIG. 2, circuit system 200 may be implemented on SOC 100. The circuit system 200 may be a part of an electronic system, such as, a telecommunication system, a computer system, or an automotive system. In one embodiment, device components 212A, 212B, 212C, and 212D may be coupled according to a master-slave arrangement. In an embodiment, one of the device components such as component 212A may be a master controller that controls corresponding slave circuits 212B, 212C, and 212D. In an embodiment, device components 212A, 212B, 212C, and 212D, monitoring circuits 210A, 210B, 210C, and 210D, interconnect circuit 106, and interface circuit 206 may be formed by configuring programmable logic elements within PLD circuit 101. In another embodiment, device components 212A, 212B, 212C, and 212D may be application specific integrated circuit (ASIC) devices or application specific standard product (ASSP) devices coupled to interconnect 106.

Referring still to FIG. 2, device components 212A, 212B, 212C, and 212D may include one or more master controller circuits and slave circuits. In an embodiment, the master controller circuit may be a central processing unit (CPU), a microprocessor, a floating-point coprocessor, a graphics coprocessor, a hardware controller, a microcontroller, a PLD configured as a controller, a network controller, or other processing unit. In another embodiment, device components 212A, 212B, 212C, and 212D may include a variety of circuits (e.g., peripheral circuits, memory circuits, digital signal processing circuits, analog-to-digital (A2D) converters, or digital-to-analog (D2A) converters).

Even though only four device components 212A-212D are shown in FIG. 2, it should be appreciated that the number of device components 212A, 212B, 212C, and 212D may vary depending on the design requirements of a particular circuit system 200. For example, in a highly peripheral circuit system, there may be a large number of peripheral circuits (i.e., slave circuits) coupled to a master controller circuit. One example of a highly peripheral circuit system is a telecommunication system. Alternatively, within a simple circuit system, the number of slave circuits coupled to a controller circuit may be small. For example, a memory controller circuit system is a simple circuit system whereby only one memory circuit (i.e., only one slave circuit) is coupled to a memory controller circuit (i.e., a master controller circuit).

Referring again to FIG. 2, device components 212A, 212B, 212C, and 212D may be coupled to monitoring circuits 210A, 210B, 210C, and 210D respectively through interconnect circuitry 106. In an embodiment, monitoring circuits 210A, 210B, 210C, and 210D are formed as a part of device components 212A, 212B, 212C, and 212D. In an embodiment, each of monitoring circuits 210A, 210B, 210C, and 210D is assigned a static base address by processing circuitry 102. Monitoring circuits 210A, 210B, 210C, and 210D may include circuitry to transmit and receive signals that are transmitted between device components 212A, 212B, 212C, and 212D through interconnect circuitry 106. Monitoring circuits 210A, 210B, 210C, and 210D may include circuitry to transmit and receive signals to processing circuitry 102 via interface circuit 206. In an embodiment, each monitoring circuit is communicatively coupled with interface circuit 206. In another embodiment, the device components are coupled according to a master-slave arrangement. The monitoring circuits coupled to the slave device components are communicatively coupled to the monitoring circuits of the corresponding master device components. The monitoring circuits of the master device component are communicatively coupled to interface circuit 206. In an embodiment, monitoring circuits 210A, 210B, 210C, and 210D may include input-output (IO) circuits.

Referring again to FIG. 2, interconnect circuitry 106 may be similar to the interconnect circuitry described in relation to FIG. 1 above. In an embodiment, interconnect circuitry 106 forms a network-on-chip that implements network technologies to communicatively connect device components 212A, 212B, 212C, and 212D to each other and their respective monitoring circuits 210A, 210B, 210C, and 210D. In an embodiment, the interconnect circuit 106 may be a simultaneous multiple controller interconnection fabric configured to receive multiple instructions from a plurality of controllers simultaneously. Interconnect circuit 106 may include multiple circuits and signal pathways, details of which are described above with reference to FIG. 1. For example, interconnect circuit 106 may include multiple signal pathways for transferring command signals between device components 212A, 212B, 212C, and 212D. A signal being transmitted through a single signal pathway may be referred to as a single-threaded signal while multiple signals being transmitted through multiple signal pathways may be referred to as multithreaded signals. In one embodiment, interconnect circuit 106 may receive consecutive command signals from controller device component up the controller device component. In one embodiment, the consecutive command signals may be associated with different slave device components.

In an embodiment, interface circuit 206 may be a specialized circuit dedicated to communicatively coupling monitoring circuits 210A, 210B, 210C, and 210D to processing circuitry 102. In another embodiment, interface circuit 206 is formed as a part of interconnect circuitry 106. In an embodiment, the processing circuitry assigns a base address and span of addresses (starting at the base address) to interface circuit 206 at boot up.

Signals exchanged among device components 212A, 212B, 212C, and 212D may be transmitted through interconnect circuitry 106 and signals exchanged between monitoring circuits 210A, 210B, 210C, and 210D and processing circuitry 102 may be transmitted via interface circuit 206. In an embodiment, the signals transmitted by monitoring circuits 210A, 210B, 210C, and 210C include notification events generated when a monitoring circuit detects a reconfiguration of the corresponding device component. If desired, the notification event may be a bit flag or a bit configuration sent by a monitoring circuit to processing circuitry 102 indicating that the device component has been reconfigured. In another suitable arrangement, the notification signal may comprise the base address of the reconfigured device component and the span of addresses (starting from the base address) associated with the device component. In yet another arrangement, processing circuitry 102 may transmit signals to a monitoring circuit to start or to stop the operation of the coupled device component. In an embodiment, the processing circuitry 102 assigns interface circuit 206 with a span of addresses such that the sum of the spans of addresses of the device components is less than or equal to the span of addresses assigned to interface circuit 206. In an embodiment, the static base addresses of monitoring circuits 210A, 210B, 210C, and 210D are stored by processing circuitry 102.

The signals being transmitted between device components 212A, 2123, 212C, and 212D may vary depending on the type of circuits used as device components 212A, 212B, 212C, and 212D. In one scenario, device components 212A, 212B, 212C, and 212D may be a processor and associated memory units. In such a scenario, a signal being transmitted between the processor and the memory units may be a read command signal or a write command signal. In this instance, a read command signal may command the memory unit to transmit stored data within the memory unit to the controller circuit while a write command signal may command the memory unit to store data received from the controller circuit.

Figure 3:
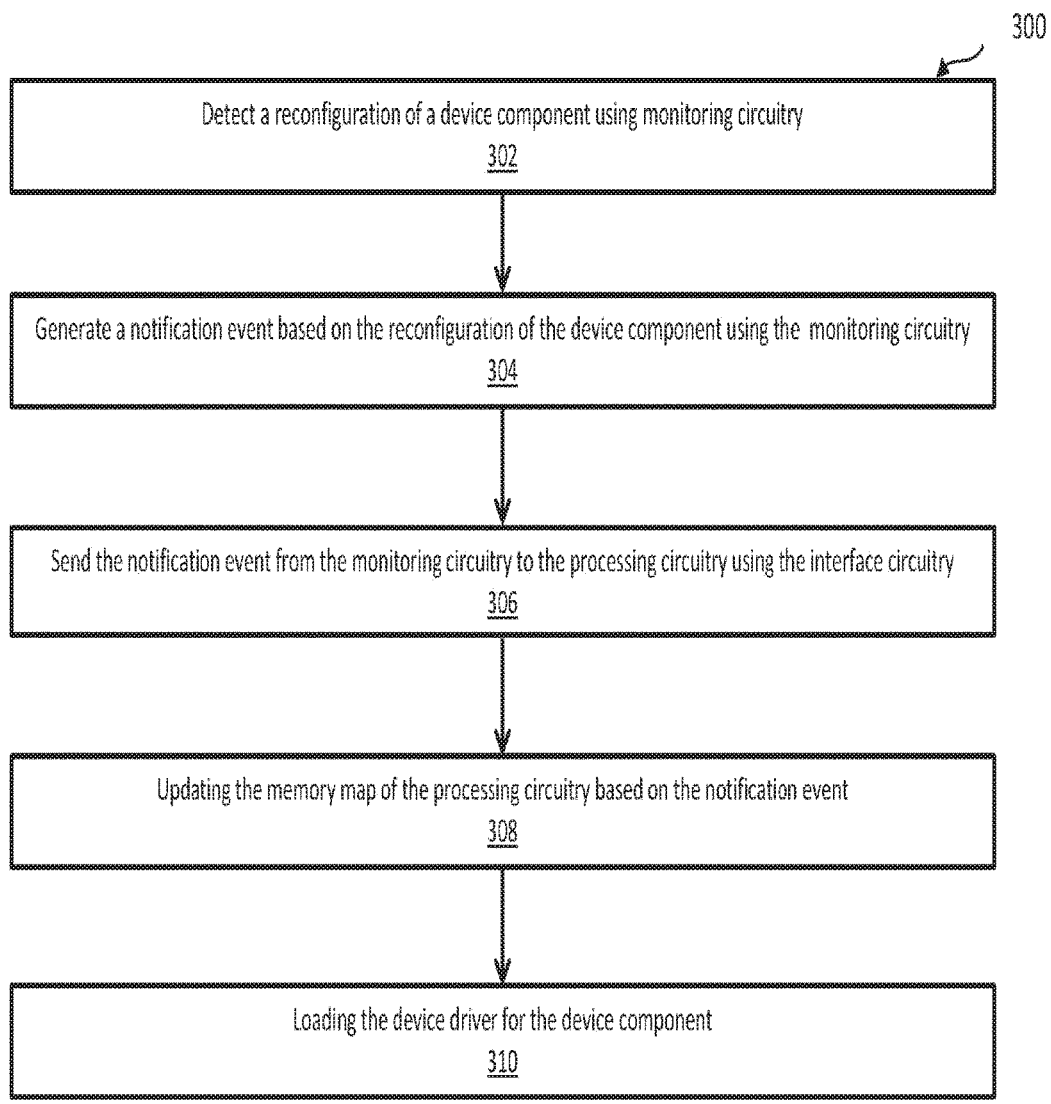
FIG. 3 illustrates an exemplary method of updating a memory map of a SOC in accordance with an embodiment of the present invention.

FIG. 3 illustrates an exemplary method of updating a memory map of a SOC in accordance with an embodiment of the present invention. For the purposes of illustrating clear examples, the circuit system 200 of FIG. 3 will be discussed in connection with the SOC 100 of FIG. 1 and circuit system 200 of FIG. 2.

Referring now to FIG. 3, process 300 begins with reconfiguration of one or more of device components 212A, 212B, 212C, and 212D. At step 302, one or more of monitoring circuits 210A, 210B, 210C, or 210D detects the reconfiguration of one or more of the corresponding device components 212A, 212B, 212C, and 212D. For example, monitoring circuit 210B may detect a reconfiguration of the device component 212B. Processing circuitry 102 may send a signal to the monitoring circuit coupled to the device component to be reconfigured to halt the device component prior to the reconfiguration.

Reconfiguration of a device component may involve configuring a reset programmable logic region 106 (as shown in FIG. 1) to form device component 212B. The reconfiguration of device component 212B may include forming a new device component in the programmable logic region 108 of the SOC 100 of the device component. If desired, the reconfiguration of device component 212B may include removing the device component by resetting the same programmable logic region 108 of the device component. The reconfiguration of device component 212B may be detected by monitoring circuit 210B by receiving a signal from device component 212B after the reconfiguration. Processing circuitry 102 may restart device component 212B after the reconfiguration by transmitting an appropriate signal to monitoring circuitry 210B. Processing may proceed to block 304 after monitoring circuit 210B detects a reconfiguration of device component 212B.

At step 304, monitoring circuit 210B generates a notification event based on the reconfiguration of device component 212B. The notification event generated after reconfiguration of device component 212B may contain the base address and span of addresses for device component 212B. The notification event may, if desired, be generated immediately after device component 212B is reconfigured. In another embodiment, device component 212B may be stopped, reconfigured, and started, whereas the notification event is generated after the device component is restarted.

At step 306, monitoring circuit 210B sends the notification event to processing circuitry 102 via interface circuit 206. For example, the notification event including the base address and the span of addresses for device component 212B may be sent to processing circuitry 102 by monitoring circuit 210B using interface circuit 206. In scenarios where the device components are in a master-slave arrangement, the notification event, may be transmitted from monitoring circuit 210B, of slave device component 212B, to monitoring circuit 210A coupled to master device component 212A. Master device component 212A may forward the notification event to processing circuitry 102 via interface circuit 206.

At step 308, processing circuitry 102 may update the system memory map for the SOC 100 maintained by processing circuitry 102 based on the notification event. From the example above, processing circuitry 102 may receive the notification event containing the base address and span of addresses for device component 212B from a base address that processing circuitry 102 identifies as the base address for monitoring circuit 210B. Processing circuitry 102 may then update the SOC 100 memory map by changing the base address and span address associated with the base address of monitoring circuit 210B to the base address and span address of device component 212B. In an example where the reconfiguration resets the programmable logic region 108 and no new device component is formed, the notification event may not include a base address and a span of addresses and processing circuitry 102 may update the SOC 100 system map accordingly.

At step 310, processing circuitry 102 may load a device driver for device component 212B. Processing circuitry 102 may receive a notification event that includes additional instructions to load a device driver for device component 212B. For example, the notification event generated by reconfiguration of device component 212B may include instructions for processing circuitry 102 to load the device driver for device component 212B. Processing circuitry 102, after updating the system map, may search for and load the device driver for device component 212B using the operating system implemented via processing circuitry 102. In an embodiment, device component 102 is inaccessible by a user because processing circuitry 102 may be unable to find or load the device driver. In another embodiment, processing circuitry 102 may send an error message to the user using the operating system if processing circuitry 102 fails to load a device driver for the device component. The process above describes updating the system map or memory map of SOC 100 because of a change in connection status of device component 212B. However, a person skilled in the art would appreciate that the above process is applicable to all the other device components 212A, 212C, and 212D.

Figure 4:
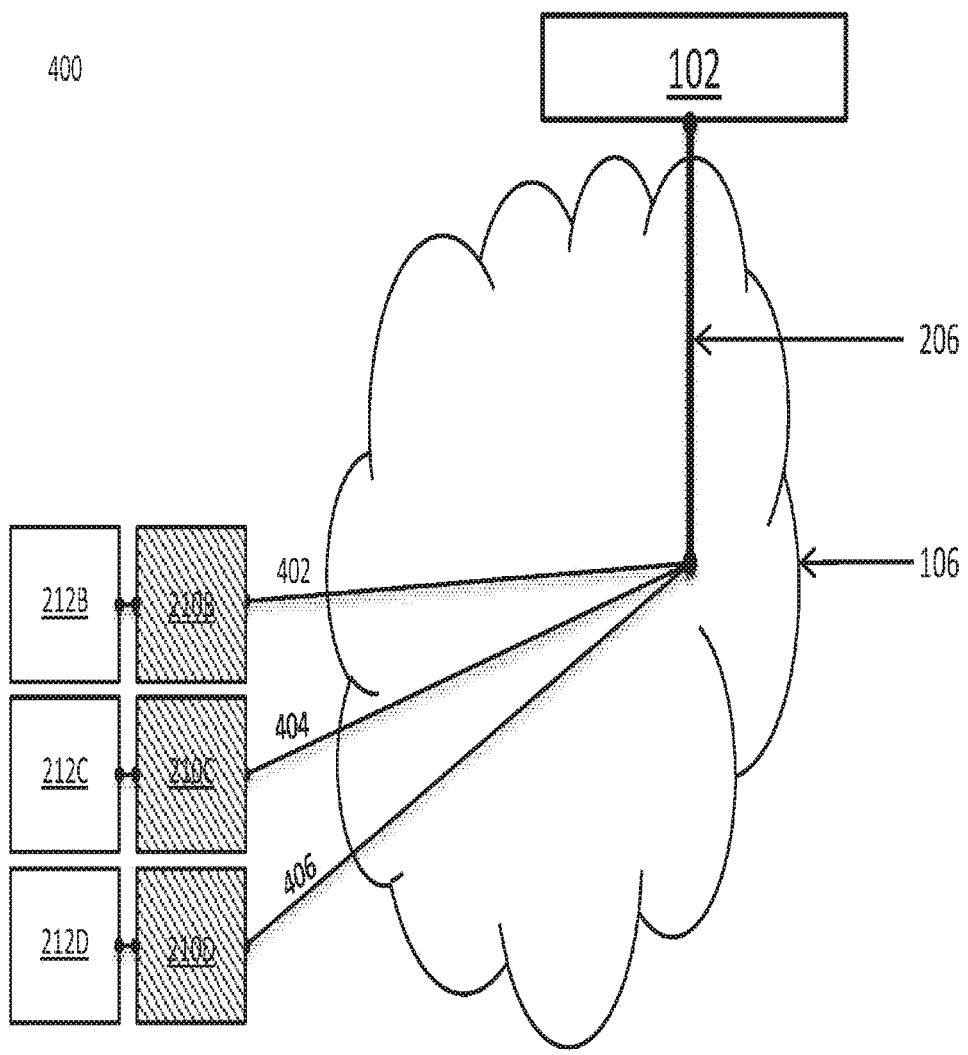
FIG. 4 illustrates an example circuit system having monitoring circuits that transmit notification events to processing circuitry at a SOC boot-up in accordance with an embodiment of the present invention.

FIG. 4 illustrates an example circuit system with monitoring circuits that transmit notification events to processing circuitry at a SOC boot-up in accordance with an embodiment of the present invention. FIG. 4 will be discussed in reference with SOC 100 of FIG. 1 and circuit system 200 of FIG. 2.

Referring now to FIG. 4, the circuit system 400 includes monitoring circuit 210B, 210C, and 210D which are respectively coupled to device components 212B, 212C, and 212D through interconnect circuitry 106. Monitoring circuits 212B, 212C, and 212D are communicatively coupled to processing circuitry 102 via interface circuit 206. Upon booting up processing circuitry 102, device components 210B, 210C, and 210D are configured according to a configuration file loaded into PLD circuit 101. In an embodiment, the configuration file may be stored in an external storage location, for example a hard drive or a flash drive. In another embodiment, the bit configuration file may be stored at a network location, for example at a cloud server, internet server, or other remote location. In yet another embodiment, the bit configuration file may be stored in a ROM component on the PLD circuit 100. Monitoring circuits 210B, 210C, and 210D may detect the reconfiguration of device components 212B, 212C, and 212D respectively and may generate notification events 402, 406, and 408 respectively. Events 402, 406, and 408 may be sent to processing circuitry 102. Each of the notification events 402, 406, and 408 may include the base address, span of addresses, and request to load device drivers for device components 212B, 212C, and 212D respectively.

Figure 5:
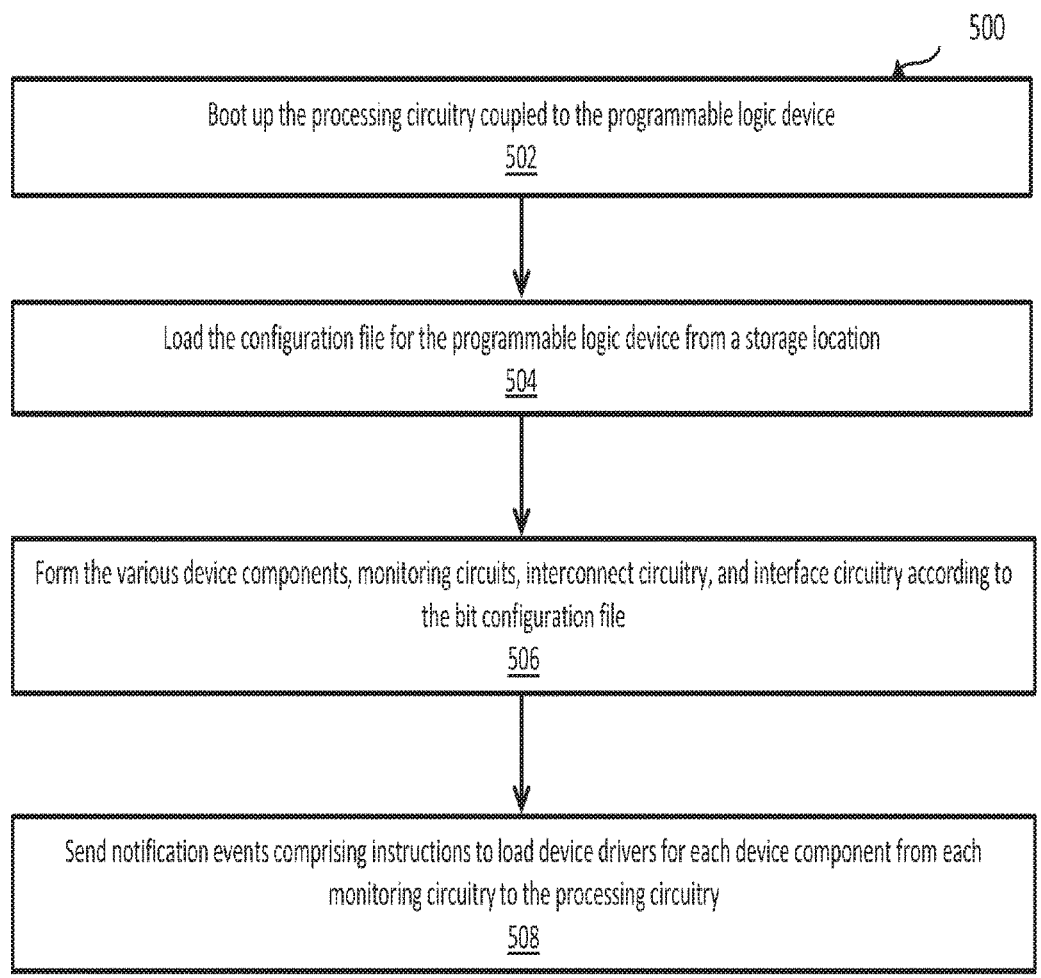
FIG. 5 illustrates an exemplary method of updating a memory map of a SOC at boot-up in accordance with an embodiment, of the present invention.

FIG. 5 illustrates an exemplary method of updating a memory map of a SOC at boot-up in accordance with an embodiment, of the present invention. In order to illustrate clear examples, the process flow of FIG. 5 will be discussed in reference with SOC 100 of FIG. 1 and circuit system 400 of FIG. 4. However, a same or substantially similar method may be used with other implementations.

Referring now to FIG. 5, at step 502 processing circuitry 102 coupled to PLD circuit 101 may be booted up. For example, processing circuitry 102 may load an operating system at boot up. In a scenario where a SOC with one or more ARM processors is coupled to an FPGA, the ARM processor may load an operating system (e.g., Linux) when the SOC is powered on.

At step 504, processing circuitry 102 may load the configuration file for PLD circuit 101 from a storage location. In an embodiment, the bit configuration file maybe retrieved by the operating system and loaded on to PLD circuit 101. Continuing the example above, the Linux operating system may load a bit configuration file from an external storage device to the FPGA.

At step 506, processing circuitry 102 may configure PLD circuit 101 to form device components 212B, 212C, and 212D, interconnect circuitry 106, and interface circuit 206 according to the bit configuration file. The bit configuration file may specify, for example, the base addresses for the monitoring circuits and the base address and span of addresses for the interface circuitry. In the example above, the programmable logic regions of the FPGA may be configured to form a ROM, a DSP, and a video controller each coupled to a monitoring circuit via the interconnect circuitry. The monitoring circuits may be connected to the ARM processors via an interface circuit.

At step 508, monitoring circuits 210B, 210C, and 210D may send notification events 402, 406, and 408 generated by monitoring circuits 210B, 210C, and 210D respectively via interface circuit 206 to processing circuitry 102. Notification events 402, 406, and 408 may include the base addresses, the spans of addresses, and instructions to load device drivers for device components 212B, 212C, and 212D. In one suitable arrangement, if the sum of spans of addresses for device components 212B, 212C, and 212D is greater than the span of addresses assigned to interface circuit 206, then SOC 100 may generated a system error. In another arrangement, SOC 100 may reboot if a system error is generated. If desired, processing circuitry 102 may assign a larger span of addresses to interface circuit 206 upon rebooting the SOC 100. Continuing the example from step 506, notification events based on formation of ROM, DSP, and video controller may be sent to the ARM processor via the interface circuit. After step 508, the process 500 may continue similarly to the process discussed above in relation to FIG. 3.

Figure 6:
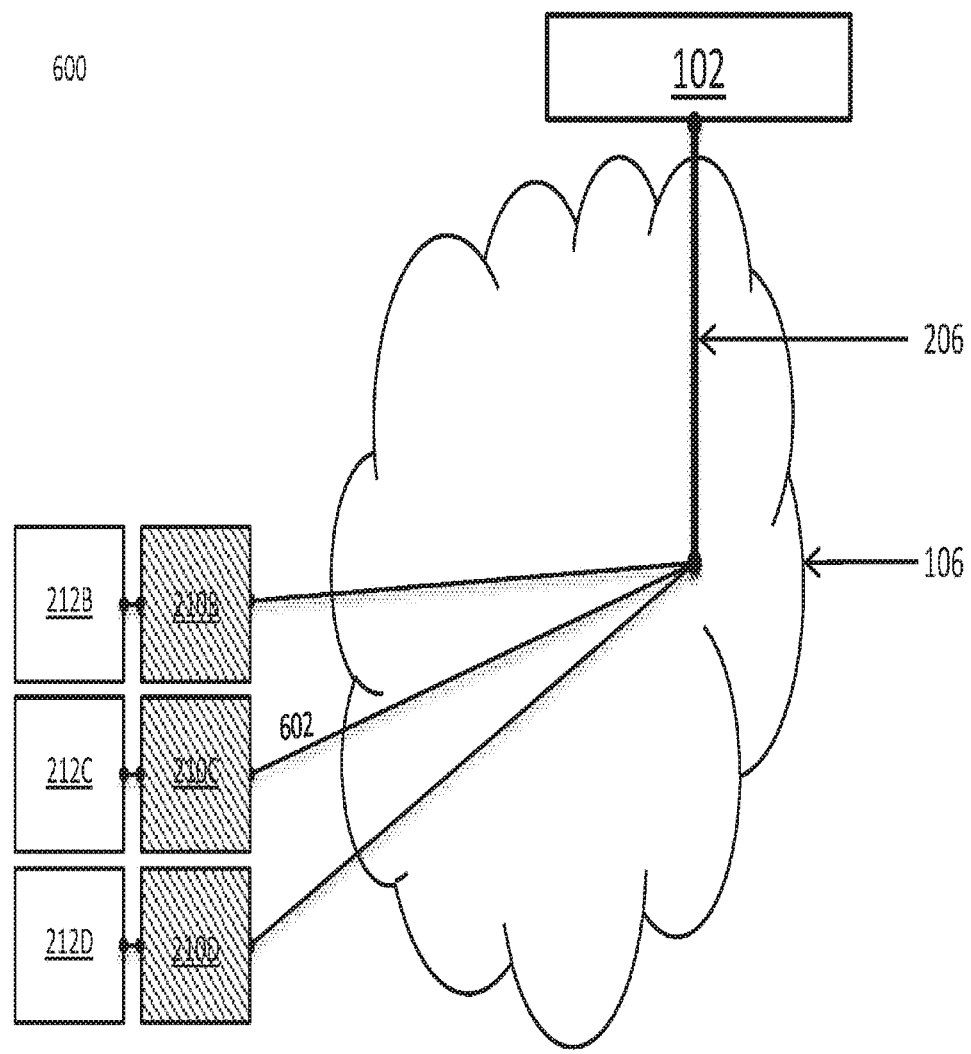
FIG. 6 illustrates an example circuit system having a monitoring circuit that transmits a notification event to processing circuitry upon detecting a reconfiguration of a device component in accordance with one embodiment of the present invention.

FIG. 6 illustrates an example circuit system with a monitoring circuit transmitting a notification event to processing circuitry upon detecting a resetting of a device component in accordance with one embodiment of the present invention. FIG. 6 will be discussed in reference with SOC 100 of FIG. 1 and circuit system 200 of FIG. 2.

Referring now to FIG. 6, circuit system 600 includes monitoring circuit 210B, 210C, or 210D which are respectively coupled to device components 212B, 212C, and 212D through interconnect circuitry 106. Monitoring circuits 210B, 210C, and 210D are communicatively coupled to processing circuitry 102 via interface circuit 206. In an embodiment, the portion of programmable logic region 108 of PLD circuit 101 where device component 212C was formed is reset. The resetting of device component 212C generates a notification event 602 by monitoring circuit 210C. The notification event is then transmitted to processing circuitry 102 as described above and processing circuitry 102 updates the system memory map.

Figure 7:
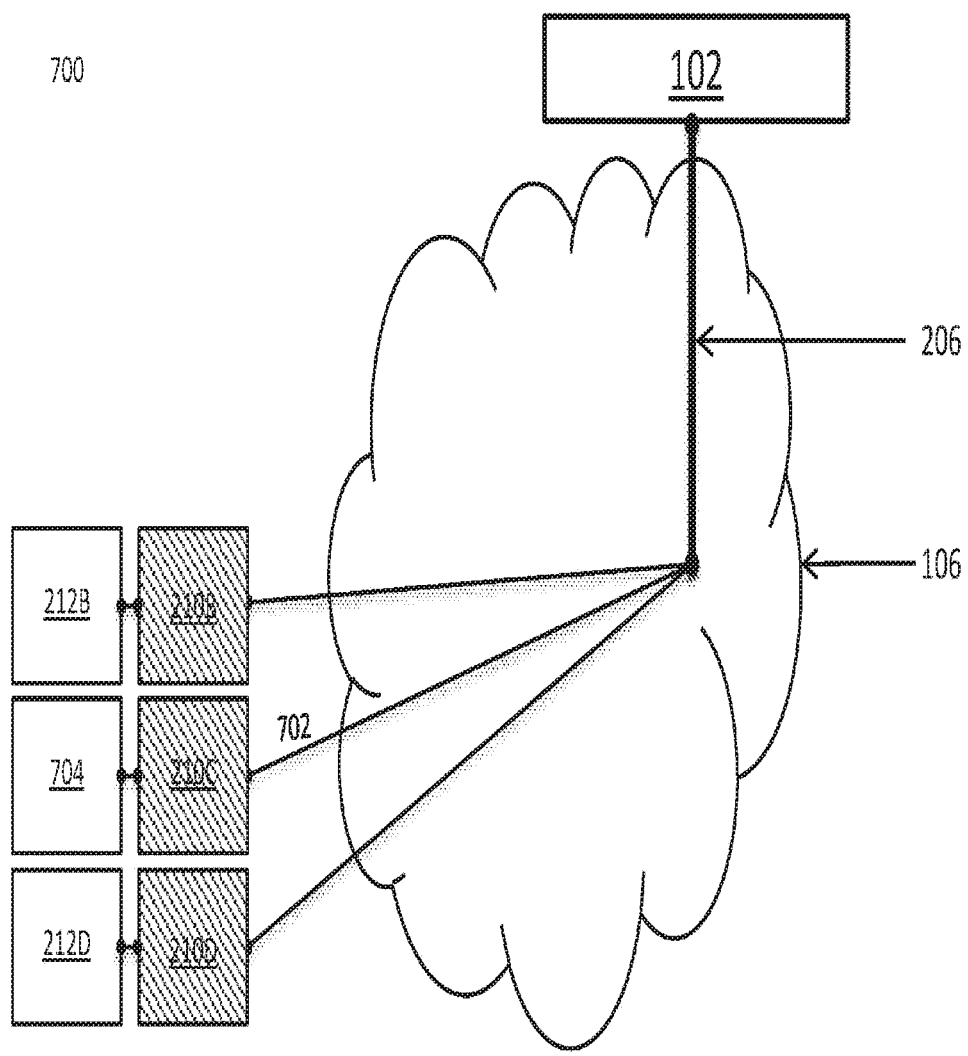
FIG. 7 illustrates an example circuit system having a monitoring circuit that transmits a notification event to processing circuitry upon detecting a reconfigured device component in accordance with one embodiment of the present invention.

FIG. 7 illustrates an example circuit system with a monitoring circuit transmitting a notification event to processing circuitry upon detecting a formation of a new device component in accordance with one embodiment of the present invention. FIG. 7 will discussed in reference with SOC 100 of FIG. 1 and circuit system 200 of FIG. 2.

Referring now to FIG. 7, circuit system 700 comprises monitoring circuit 210B, 210C, or 210D which are respectively coupled to device component 212B, new device component 704, and device component 212D through an interconnect circuitry 106. Monitoring circuits 210B, 210C, and 210D are communicatively coupled to processing circuitry 102 via interface circuit 206. In an embodiment, the portion of programmable logic region 108 of PLD circuit 101 where device component 212C was formed is reconfigured to form new device component 704. The formation of device component 704 generates a notification event 702 by monitoring circuit 210C. The notification event is then transmitted to processing circuitry 102 as described above and processing circuitry 102 updates the system memory map. In an embodiment, new device component 704 is different from device component 212C and may have a different base address and different span of addresses. In one scenario, new device component 704 may be the same as device component 212C but may have a different base address and different span of addresses. In yet another scenario, new device component 704 is the reset portion of the programmable logic region 108 in which the device component 212C was formed.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims.

What is claimed is:

1. A method of updating a memory map associated with processing circuitry that is coupled to a field programmable gate array (FPGA), the method comprising:
    performing reconfiguration of a first portion of the field programmable gate array (FPGA) to implement a first device component in the first portion of the FPGA;
    updating the memory map, wherein the memory map is configured to enable communication access by the processing circuitry with the first device component via a peripheral bus; and
    using the memory map in communication between the processing circuitry and the first device component.

2. The method of claim 1, wherein using the memory map in communication between the processing circuitry and the first device component comprises using a device driver for the first device component.

3. The method of claim 2, wherein the device driver for the first device component runs on an operating system executed by the processing circuitry.

4. The method of claim 3, wherein the operating system comprises Linux.

5. The method of claim 1, wherein updating the memory map comprises changing a base address or a span address of a portion of the memory map associated with the first device component.

6. The method of claim 1, wherein communication between the processing circuitry and the first device component occurs via a kernel of the operating system, wherein the kernel has access to the first device component using the memory map.

7. The method of claim 1, wherein the memory map is updated without rebooting the processing circuitry.

8. The method of claim 1, wherein performing reconfiguration of the first portion of the FPGA to implement the first device component comprises removing a prior device component.

9. The method of claim 1, wherein the processing circuitry comprises a central processing unit (CPU).

10. A system comprising:
    a processor;
    a programmable logic device coupled to the processor by an interconnect, wherein the programmable logic device comprises a programmable device component implemented in a first portion of the programmable logic device; and
    a system memory map associated with the processor;
    wherein the system memory map is configured to be updated based at least in part on a reconfiguration of the programmable device component implemented in the first portion of the programmable logic device without rebooting the processor.

11. The system of claim 10, wherein the programmable logic device comprises a field programmable gate array (FPGA).

12. The system of claim 10, wherein the programmable device component comprises one of a plurality of programmable device components communicatively coupled to the processor by the interconnect.

13. The system of claim 12, wherein the system memory map is configured to enable respective access to the plurality of programmable device components.

14. The system of claim 10, wherein the memory map is configured to enable the processor to access the programmable device component as a peripheral circuit.

15. The system of claim 10, wherein the processor is configured to run a device driver for the programmable device component.

16. The system of claim 10, wherein the processor comprises a central processing unit (CPU).

17. The system of claim 10, wherein the system memory map is configured to be updated by changing a base address or a span address of a portion of the system memory map associated with the programmable device component.

18. A system comprising:
a processor;
field programmable gate array (FPGA) circuitry in communication with the processor; and
a system memory map associated with the processor;
wherein the processor is configured to cause a first device component implemented in a first portion of the FPGA circuitry to be removed and replaced with a second device component in the first portion of the FPGA circuitry through reconfiguration of the first portion of the FPGA circuitry, and wherein the processor is configured to update the system memory map based at least in part on the reconfiguration of the first portion of the FPGA circuitry.

19. The system of claim 18, wherein the processor is configured to update the system memory map without rebooting.

20. The system of claim 18, wherein the processor is configured to run a device driver configured to attach to the second device component using the updated memory map.

* * * * *